(12) United States Patent
Kasper et al.

(10) Patent No.: US 8,825,905 B2
(45) Date of Patent: Sep. 2, 2014

(54) MAINFRAME WEB CLIENT

(75) Inventors: Michael P. Kasper, Poughkeepsie, NY (US); Ulrich Kurz, Herrenberg, DE (US); Gary S. Puchkoff, Poughkeepsie, NY (US); Bertold Reddemann, Esslingen, DE (US); Peter D. Van Dyke, Woodlands (AU)

(73) Assignee: International Business Machines Corporation, Armonk, NY (US)

( * ) Notice: Subject to any disclaimer, the term of this patent is extended or adjusted under 35 U.S.C. 154(b) by 192 days.

(21) Appl. No.: 13/079,539

(22) Filed: Apr. 4, 2011

(65) Prior Publication Data

US 2012/0254467 A1     Oct. 4, 2012

(51) Int. Cl.
    *G06F 15/173*        (2006.01)
    *H04L 29/08*        (2006.01)

(52) U.S. Cl.
    CPC .................................... *H04L 67/02* (2013.01)
    USPC ............................. 709/246; 709/217; 709/227

(58) Field of Classification Search
    CPC ... G06F 3/048; G06F 9/4443; G06F 17/2247; G06F 3/04817; G06F 17/3089; G06F 3/0484; G06F 3/04845; G06F 8/34; G06F 8/38; G06F 9/44; G06F 17/3087; G06F 15/16; G06F 15/18; G06F 17/227
    See application file for complete search history.

(56) References Cited

U.S. PATENT DOCUMENTS

| | | | |
|---|---|---|---|
| 4,586,134 A | 4/1986 | Norstedt | |
| 5,021,949 A | 6/1991 | Morten et al. | |
| 5,212,793 A | 5/1993 | Donica et al. | |
| 5,754,830 A | 5/1998 | Butts et al. | |
| 5,872,915 A | 2/1999 | Dykes et al. | |
| 6,125,384 A | 9/2000 | Brandt et al. | |
| 6,144,990 A | 11/2000 | Brandt et al. | |
| 6,205,415 B1 | 3/2001 | Butts et al. | |
| 6,252,591 B1 | 6/2001 | Dockweiler et al. | |
| 6,810,429 B1 * | 10/2004 | Walsh et al. | 709/246 |
| 6,826,597 B1 * | 11/2004 | Lonnroth et al. | 709/207 |
| 6,970,823 B1 | 11/2005 | Yago et al. | |
| 7,343,310 B1 | 3/2008 | Stender | |
| 7,392,506 B2 | 6/2008 | Garcowski et al. | |
| 7,523,447 B1 * | 4/2009 | Callahan et al. | 717/135 |
| 7,761,484 B2 * | 7/2010 | Christensen et al. | 707/807 |
| 7,769,828 B2 * | 8/2010 | Nadel et al. | 709/219 |
| 2002/0087630 A1 * | 7/2002 | Wu | 709/203 |
| 2005/0149347 A1 | 7/2005 | Chew | |

(Continued)

FOREIGN PATENT DOCUMENTS

EP            0408309 A2     1/1991

OTHER PUBLICATIONS

Author: IBM developerWorks, "Convert XML to JSON in PHP", Date: Jun. 5, 2007, "http://www.ibm.com/developerworks/xml/library/x-xml2jsonphp/#N1014C".*

(Continued)

*Primary Examiner* — Douglas W Owens
*Assistant Examiner* — Monica C King
(74) *Attorney, Agent, or Firm* — Cantor Colburn LLP; William A. Kinnaman, Jr.

(57) ABSTRACT

A method includes receiving a message in a JavaScript object notation (JSON) format from a first processor, converting the message from the JSON format into a hypertext markup language (HTML) format, and presenting the content of the message in the HTML format to a user on a display.

11 Claims, 11 Drawing Sheets

(56) References Cited

U.S. PATENT DOCUMENTS

| | | | |
|---|---|---|---|
| 2005/0262493 | A1 | 11/2005 | Schmidt et al. |
| 2006/0075110 | A1* | 4/2006 | Seraphin .................. 709/227 |
| 2007/0118648 | A1 | 5/2007 | Millefiorini et al. |
| 2007/0277174 | A1 | 11/2007 | Cai et al. |
| 2009/0094315 | A1 | 4/2009 | Nadel et al. |
| 2009/0172792 | A1* | 7/2009 | Backhouse .................. 726/6 |
| 2009/0199077 | A1 | 8/2009 | Sar et al. |
| 2009/0327468 | A1 | 12/2009 | Hirsch et al. |
| 2010/0076956 | A1 | 3/2010 | Ranney et al. |
| 2010/0083277 | A1* | 4/2010 | Malladi et al. .............. 719/313 |
| 2010/0185862 | A1* | 7/2010 | Moore et al. .................. 713/171 |
| 2011/0161349 | A1 | 6/2011 | Ireland et al. |
| 2012/0254372 | A1* | 10/2012 | Vandendorpe .............. 709/220 |

OTHER PUBLICATIONS

"BMC MainView AutoOperator for z/Os," BMC Software, Copyright 2005-2011 BMC Software, Inc., [online]; [retrieved on Feb. 28, 2011]; retrieved from the Internet http://www.bmc.com/products/product-listing/28229-8571-2061.html.

"CA Endevor Software Change Manager," Copyright 2011 CA, [online]; [retrieved on Feb. 28, 2011]; retrieved from the Internet http://www.ca.com/us/products/detail/ca-endevor-software-change-manager.aspx.

Personal Communications,, [online]; [retrieved on Feb. 25, 2011]; retrieved from the Internet http://www-01.ibm.com/software/network/pcomm/.

Rational Host Access Transformation Services, [online]; [retrieved on Feb. 25, 2011]; retrieved from the Internet http://www-01.ibm.com/software/awdtools/hats/.

"TSO/ISPF Client Gateway," IBM Library Server, Copyright 1989, 2005 IBM Corporation, [online]; [retrieved on Feb. 28, 2011]; retrieved from the Internet http://publibz.boulder.ibm.com/cgi-bin/bookmgr/BOOKS/ispzpc80/1.3.4.

Websphere Host On-Demand, [online]; [retrieved on Feb. 25, 2011]; retrieved from the Internet http://www-01.ibm.com/software/sebservers/hostondemand/.

IBM, "Queueing and Serialization method for Software Pipes on Large Scale Operating Sytems", IBM Technical Disclsoure Bulletin; pp. 71-74 Docuemtn ID: NN961271} published Dec. 1, 1996.

Ebbers, "Introduction to the New Mainframe: z/OS Basics"; pp. 472-474, 513, 543-655, published Aug. 2009.

IBM "Queueing and Serialization Method for Software Pipes on Large Scale Operating Systems"—IBM Technical Disclosure Bulletin; pp. 71-74 [Document Id: NN961271] published Dec. 1, 1996.

* cited by examiner

MAINFRAME WEB CLIENT

The present invention relates to mainframe computing, and more specifically, to mainframe computing with a webclient servlet.

Mainframe computers typically interact with terminals that are communicatively connected to the mainframe. The terminals are operative to send and receive messages and data using time sharing option (TSO) messages and interactive system productivity facility (ISPF) messages. TSO allows a user to, for example, create, maintain, and compile programs and interactively test batch and on-line programs. ISPF provides a terminal interface having a set of panels. The panels often include means to run tools on TSO. ISPF often includes an application programming interface (API).

BRIEF SUMMARY

According to one embodiment of the present invention, a method includes receiving a message in a JavaScript object notation (JSON) format from a first processor, converting the message from the JSON format into a hypertext markup language (HTML) format, and presenting the content of the message in the HTML format to a user on a display.

According to another embodiment of the present invention, a system includes a display, and a first processor communicatively connected to the display, the first processor operative to receive a message in a JavaScript object notation (JSON) format from a second processor, convert the message from the JSON format into a hypertext markup language (HTML) format, and present the content of the message in the HTML format to a user on the display.

According to another embodiment of the present invention, a method includes receiving an input from a user on a first processor, converting the input from a hypertext markup language (HTML) format to a JavaScript object notation (JSON) format message, and sending the JSON message to a second processor.

According to yet another embodiment of the present invention, a system includes a display, and a first processor communicatively connected to the display, the first processor operative to receive an input from a user on a first processor, convert the input from a hypertext markup language (HTML) format to a JavaScript object notation (JSON) format message, and send the JSON message to a second processor.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
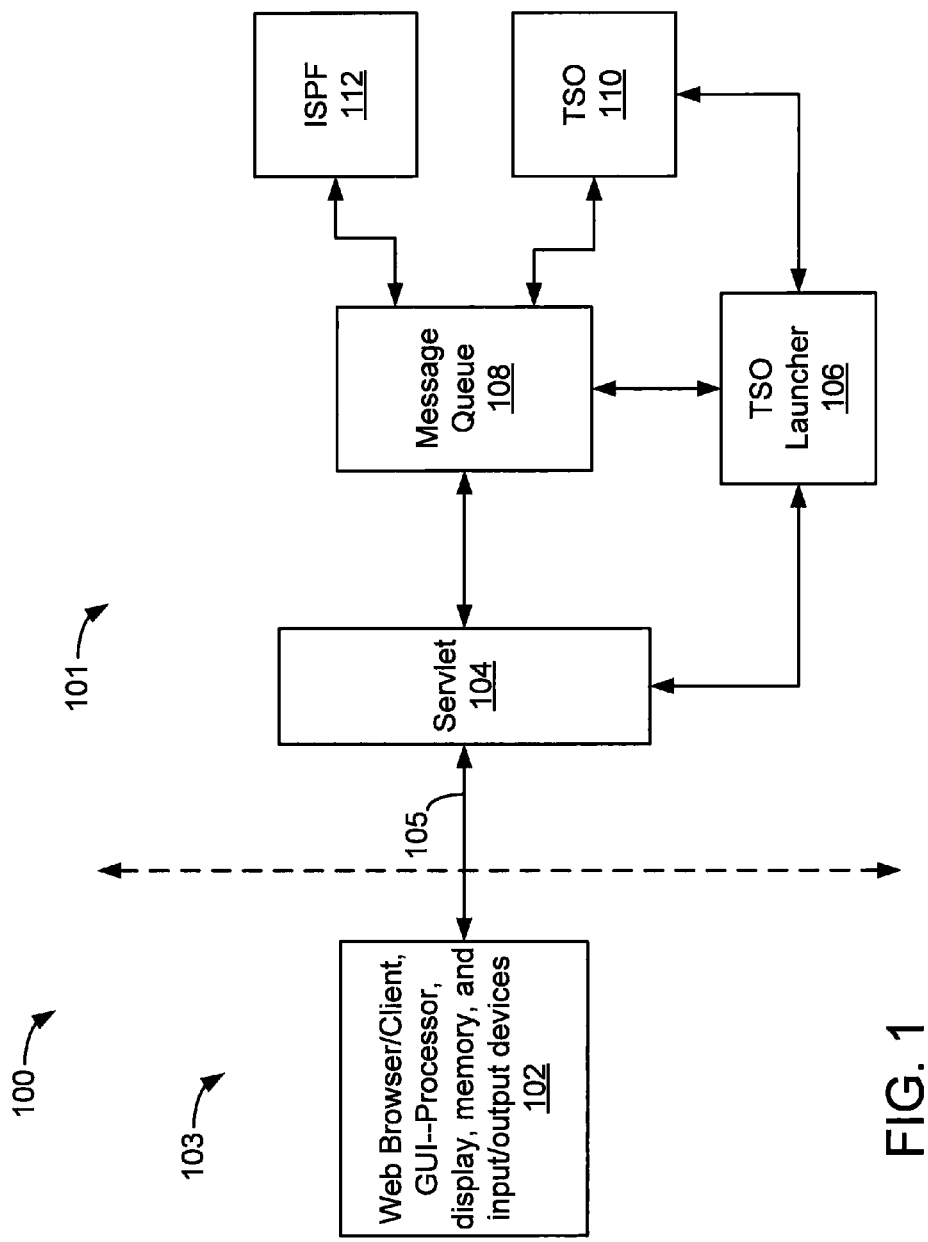
FIG. 1 illustrates a block diagram of an exemplary embodiment of a system.

FIG. 1 illustrates a block diagram of an exemplary embodiment of a system 100. The system 100 includes a processor (mainframe) 101 that includes, for example a processor such as a mainframe and associated memory, input, and output devices that are operative to perform, for example, processing tasks and applications, and a user processor 103 that may include, for example a processing terminal or computer that includes a processor, memory, input, output, and display devices that are operative to perform processing tasks and applications and may receive and present data to a user via a graphical user interface (GUI). The user processor 103 includes a web browser and/or web client (client) 102 that operates on a computer and is communicatively connected to the processor 101 via a communicative link 105 that may include, for example, an Internet or other type of network communicative connection. The client 102 is operative to send and receive data to and from the processor 101 and present the data to a user. In the illustrated embodiment, the client 102 acts as a terminal user interface. The processor 101 includes a number of entities that may include for example, applications or services that may be processed and performed by the processor 101. The processor 101 includes a servlet portion 104 that is communicatively connected to the client 102. The servlet 104 is operative to send and receive data from a time sharing option (TSO) launcher portion 106 and message queues 108. Each message queue 108 is associated with a time sharing option (TSO) address space and an interactive system productivity facility (ISPF) session. Though the illustrated embodiment includes a single client 102, alternate embodiments may include any number of similar clients 102 that may be communicatively connected to the servlet 104. The processor 101 may perform or reserve address spaces for any number of message queues 108 and associated TSO 110 and ISPF 112.

In this regard, the servlet 104 provides interfaces for the client 102 to request a TSO 110 address space. Once the TSO address space 110 is reserved, the servlet 104 may send and receive both TSO and ISPF messages to and from the TSO 110 and ISPF 112. The servlet 104 communicates with the client 102 using a JavaScript Object Notation (JSON) message format and converts messages received from the client 102 into a Unicode Transformation Format-8-bit (UTF-8) format readable by the TSO 110 address space such as, for example, {"TSO RESPONSE": {"VERSION":"0100","DATA": "TIME"}}. The client 102 is operative to receive JSON messages from the servlet 104 and convert the JSON messages into a format that may be displayed to a user in a web browser interface using a communications protocol such as, for example hypertext transfer markup language (HTML) or another type of communications protocol. The servlet 104 provides a service to the client 102 to, for example, terminate the address space and provides "housekeeping duties" to properly maintain the address spaces in the processor 101. In the illustrated embodiments the interactions with the message queues 108, TSO launcher 106 and TSO 110 address spaces may be performed using user credentials provided by the client 102. The servlet 104 maintains a hash map that maps the client 102 or user to the proper message queue 108 and maintains other pertinent data. The servlet 104 maintains a hash map entry for all of the active TSO address spaces that it has started. The hash map includes relevant information about the TSO address space and the associated web browser session, including a unique servlet key, timestamp, state information, and data returned by the TSO launcher such as the message queue identifier.

Figure 2A:
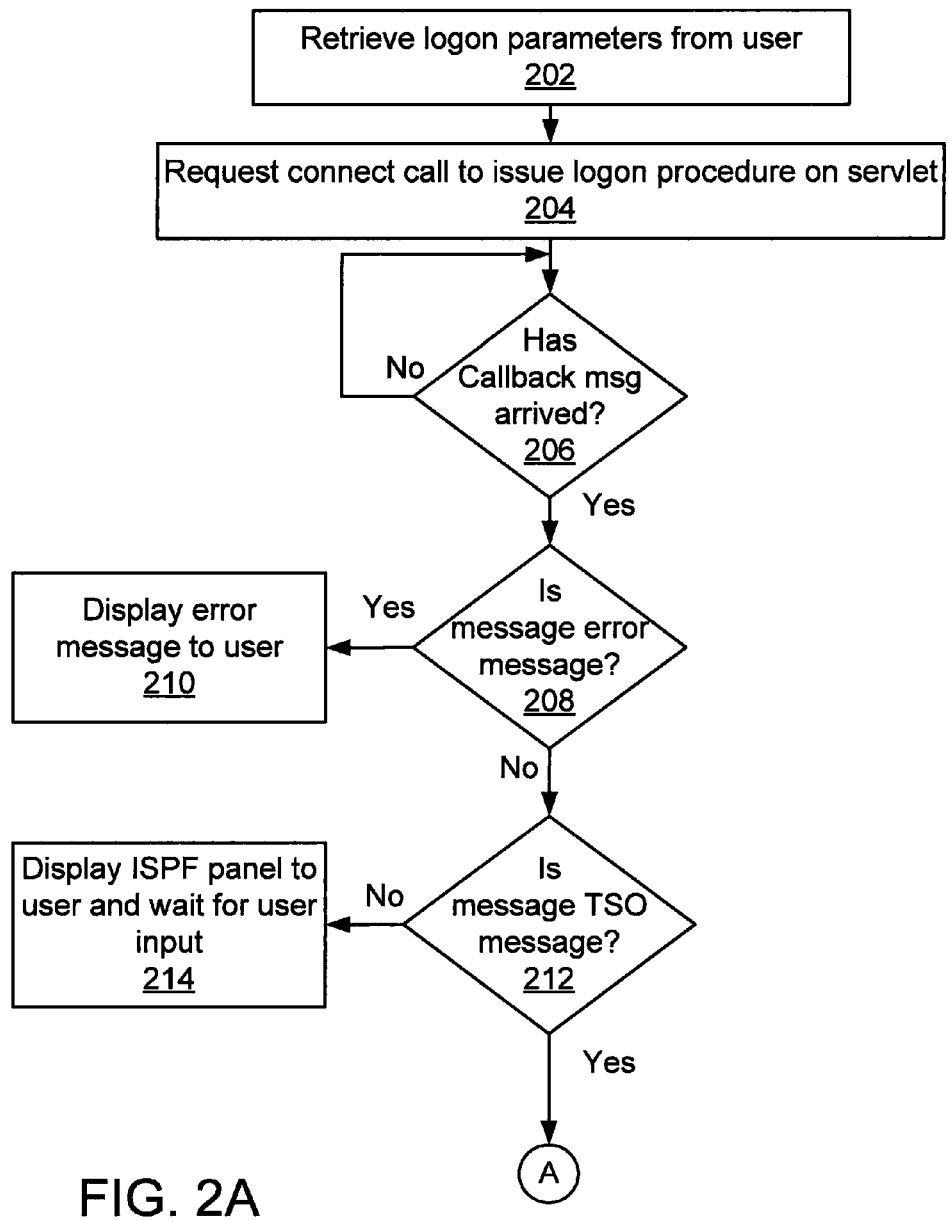
FIGS. 2A-B illustrate a block diagram of an exemplary embodiment of a method for starting a session between the client and the address space of the mainframe processor of FIG. 1.
Figure 2B:
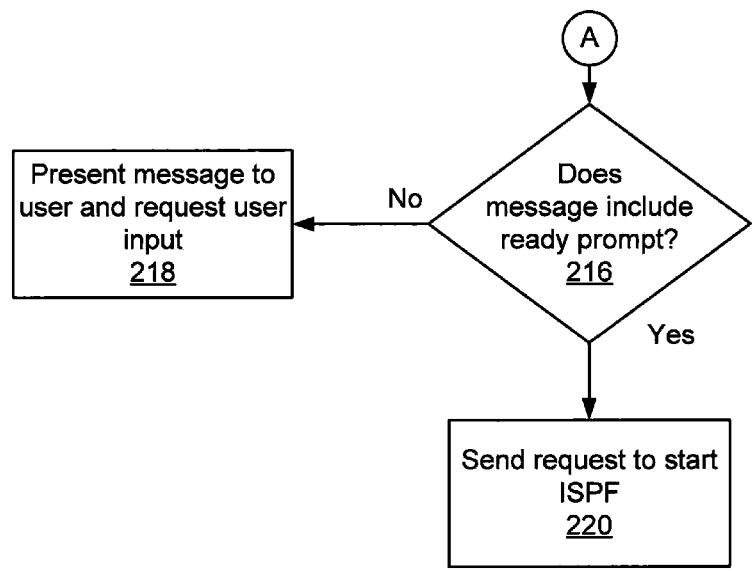

FIGS. 2A-B illustrate a block diagram of an exemplary embodiment of a method for starting a session between the client 102 (of FIG. 1) and the mainframe processor 101. Referring to FIG. 2A, in block 202 logon parameters such as, for example, a user name and logon procedure are received by the client 102. In block 204, the client 102 sends a connect call message that includes the logon parameters to the servlet 104. The servlet 104 processes the logon parameters and sends a request to the TSO launcher 106 to initialize a TSO address space. In block 206, the client 102 determines whether a callback message has been received from the servlet 104. If yes, the client 102 determines whether the received message is an error message in block 208. If the message is an error message, the client 102 displays the error message to the user on a display in block 210. In block 212, if the message is not an error message, the client determines whether the message is a TSO message as indicated by the headers in the JSON data structure that includes labels indicative of error messages, TSO messages, and ISPF messages. If the message is not a TSO message, the client 102 processes the message and displays the message in an ISPF panel window to the user on the display in block 214. If the message is a TSO message (in block 212), the client 102 determines whether the message includes a ready prompt. If no, the client presents the content of the message to the user and requests user input in block 218. If yes (in block 216), the client 104 sends a request to the mainframe processor 101 to start an ISPF 112 session in block 220.

Figure 3A:
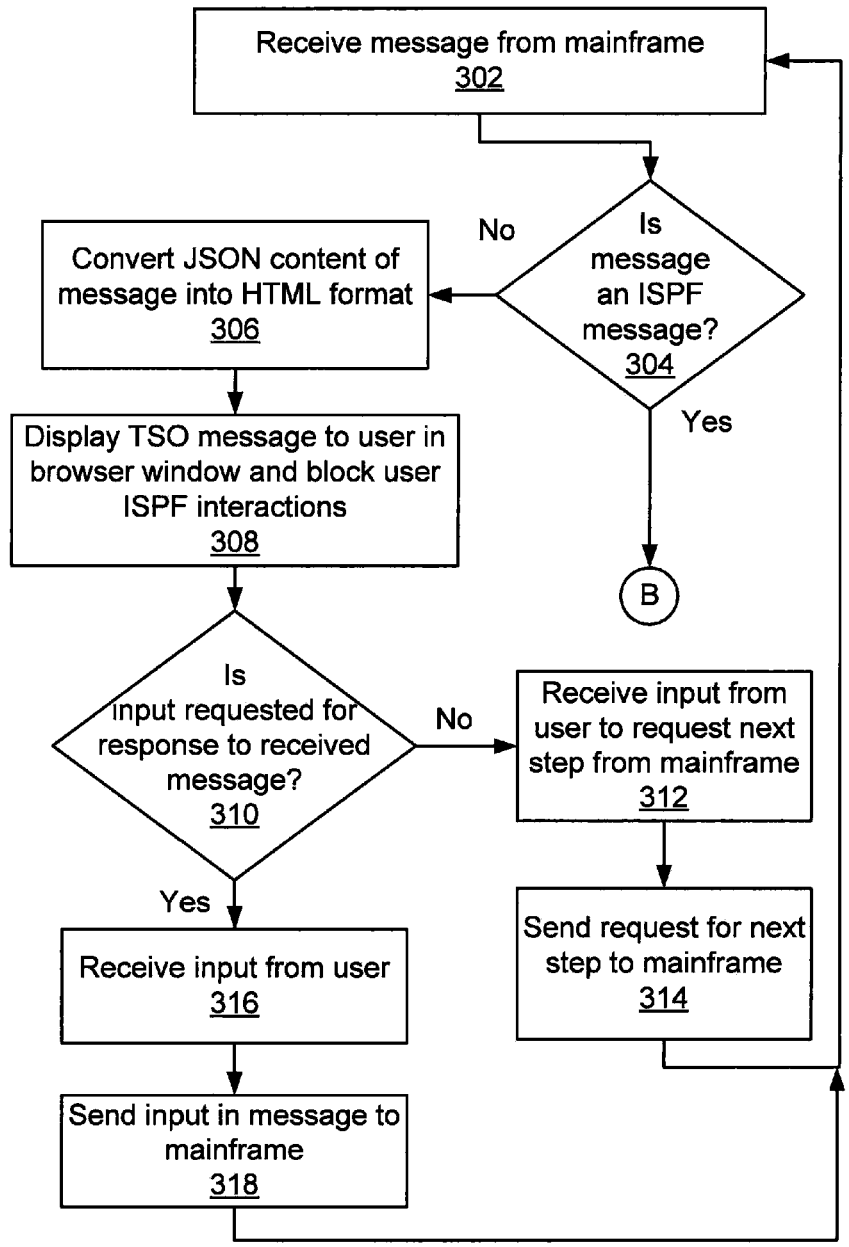
FIGS. 3A-B illustrate a block diagram of an exemplary method for receiving and processing messages sent by the mainframe processor to the client of FIG. 1.
Figure 3B:
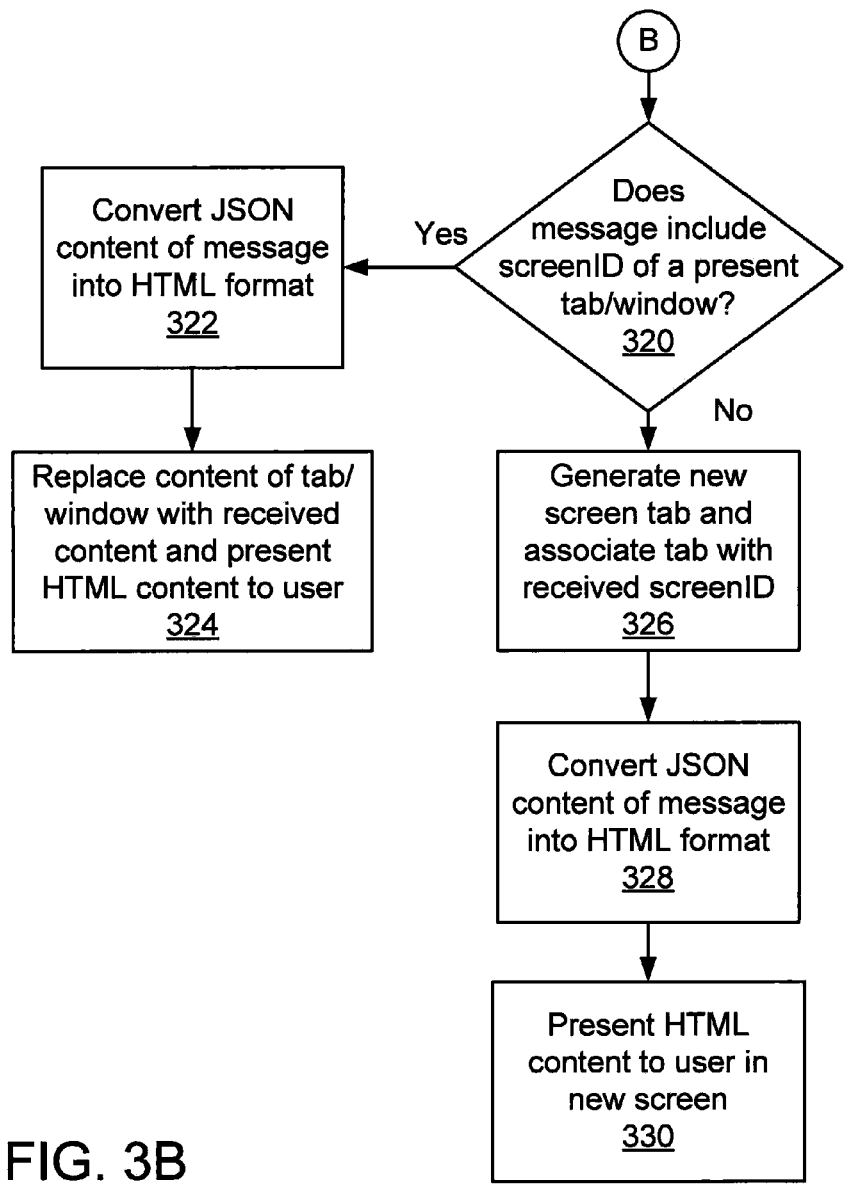

FIGS. 3A-B illustrate a block diagram of an exemplary method for receiving and processing messages sent by the mainframe processor 101 (of FIG. 1) to the client 102. The descriptions below include the sending of messages between the client 102 and the mainframe processor 101. In this regard, the messages are sent between the client 102 and TSO 110 address space of the processor 101 via the servlet 104 application. For illustrative purposes, it will be understood that when referring to a message sent between the client 102 and the mainframe processor 101 the messages will pass through the servlet 104. Referring to FIG. 3A, in block 302, a message is received by the client 102. In block 304, the client 102 determines whether the message is an ISPF message in a similar manner as described above. If the message is not an ISPF message, the client 102 converts the TSO message from a JSON format into a HTML format in block 306. In block 308, the client 102 displays the TSO message in a display window such as, for example a popup window or other similar graphical user interface (GUI) representation space and may block user ISPF interactions. The ISPF interactions are blocked by, for example, preventing the user from entering inputs into ISPF windows that may be displayed by the client 102. In block 310, the client 102 determines whether an input by the user is requested by the TSO message. If yes, in block 316, the client 102 prompts the user for input, by for example, presenting an instruction to the user or providing an input means such as, for example, a user input field or button to the user. The client receives the input from the user, and sends the input that may include or imply a request for a processing step by the mainframe processor 101 to the mainframe processor 101 in block 318. If no input is requested for a response to the received message (in block 310), the client 102 may receive an input from the user such as, a key stroke, or selection of a button such as, for example, an "OK" button in block 312. The client 102 receives the user input, and sends the input in a message to the mainframe processor 101 in block 314. If the message is an ISPF message (in block 304), the client 102 determines whether the message includes a screen ID that is associated with a window or tab that is being displayed (or is available for selection) by the user in block 320 (of FIG. 3B). A screen ID includes a unique identifier of a window or tab and is used to direct received messages to be displayed on a proper window or tab to the user on the client 102. If yes, in block 322, the client converts the message from JSON format into HTML format. In block 324, the content of the tab/window is replaced with the content of the received message in HTML format. If no (in block 320), the client 102 generates a new tab/window and associates the new tab/window with the received screen ID in block 326. In block 328, the client 102 converts the JSON content of the message into HTML format. In block 330, the client 102 presents the content of the message in HTML format to the user in the new tab/window.

Figure 4:
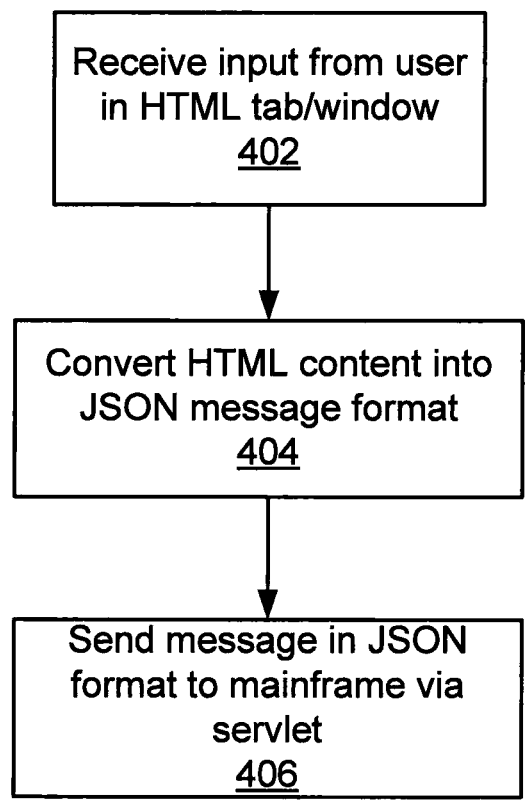
FIG. 4 illustrates a block diagram of an exemplary method for sending input from a user to the mainframe processor of FIG. 1.

FIG. 4 illustrates a block diagram of an exemplary method for sending input from a user to the mainframe processor 101 (of FIG. 1). In block 402, the client 102 receives an input from a user in a tab/window or other input means presented to the user in an HTML interface. In block 404, the client 102 converts the HTML content into a JSON message format that may include, for example, a unique key that identifies the TSO address space that will receive the message, and a screen ID that identifies the tab/window that is being used by the user to input the data or instruction. In block 406, the client 102 sends the JSON formatted message to the TSO 110 address space or other entity on the mainframe processor 101 via the servlet 104.

Figure 5:
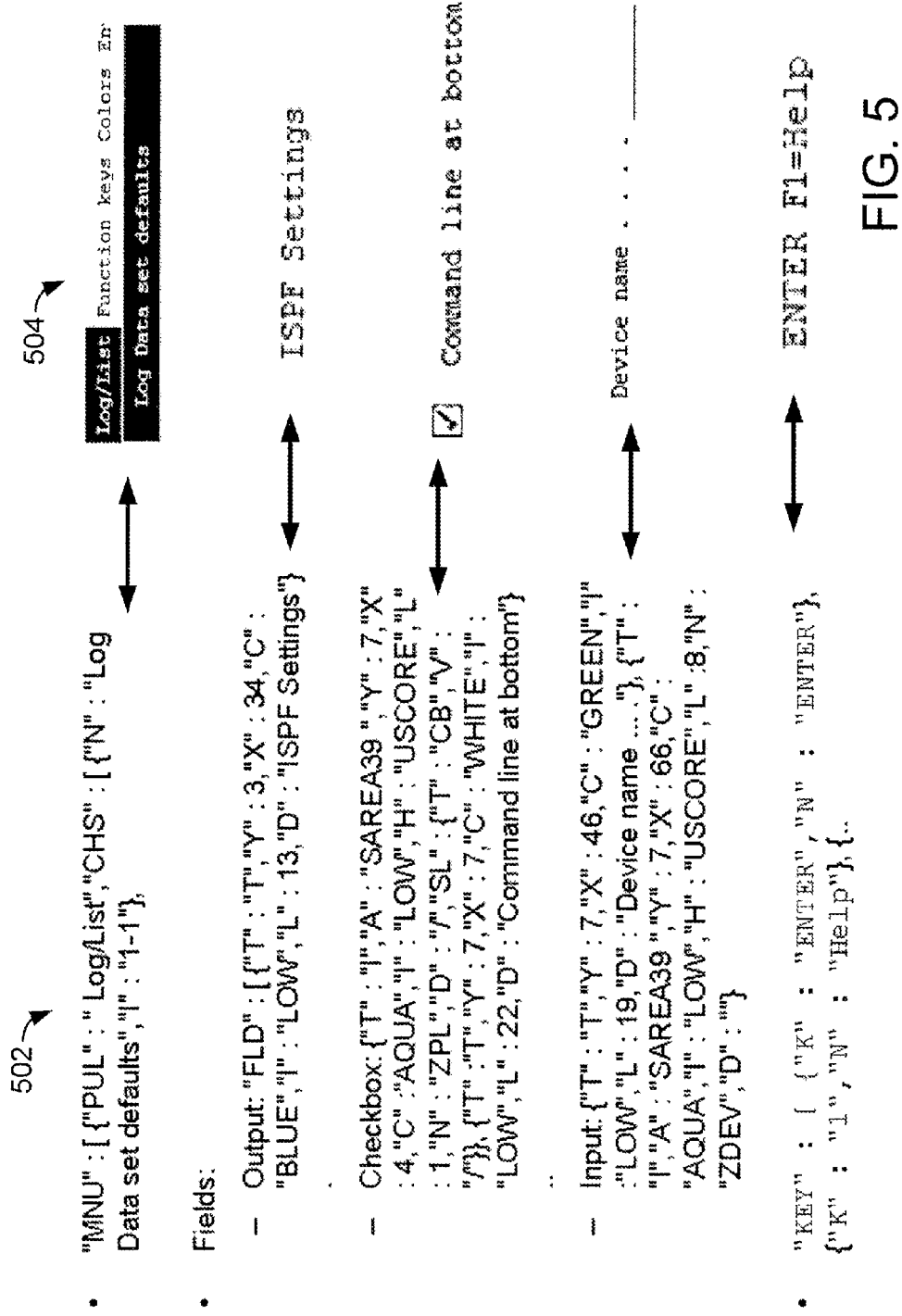
FIG. 5 illustrates examples of JSON snippets and graphical representations generated by associated HTML snippets.

FIG. 5 illustrates examples of JSON snippets 502 and corresponding graphical representations 504 of the corresponding HTML snippets. In this regard, the client 102 is operative to receive a JSON snippet 502 and convert the JSON snippet 502 into a HTML snippet that may be displayed to the user on the client 102 display. For example, the JSON snippet 502 for a menu includes "MNU":["PUL":"Log/List", "CHS":[{"N":"Log Data set defaults","I":"I"}, and a corresponding HTML snippet includes <div dojoType='dijit.PopupMenuBarItem' label='Log/List' id='1'><div dojoType='dijit.PopupMenuItem' label='Log Data set defaults' id='1-1' onclick='wi.MenuBarRenderer.fireClick('1-1')></div></div>. The corresponding HTML snippet may be presented to the user on a display as shown in FIG. 5. Other conversions for JSON to HTML snippets may be performed in a similar manner.

The client 102 is also operative to receive data or other inputs input by the user in the HTML format and convert the inputs into a JSON message format that may be sent to the mainframe processor 101 via the servlet 104. As discussed above, the servlet 104 is operative to receive JSON formatted messages and convert the messages, if desired, into a format that may be processed by the address space of the mainframe processor 101.

Figure 6A:
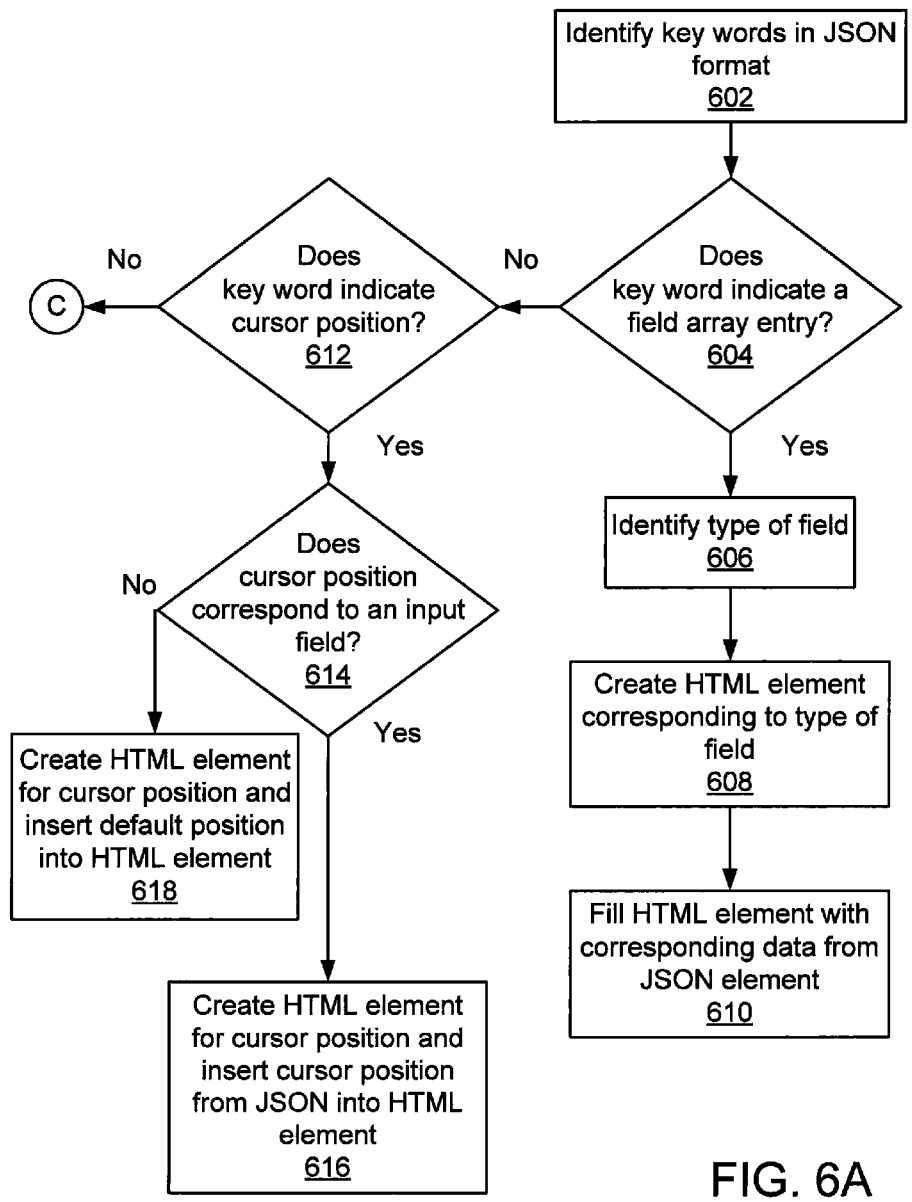
FIGS. 6A-B illustrate a block diagram of an exemplary method for converting the JSON snippets to the HTML snippets associated with the graphical representations of FIG. 5.
Figure 6B:
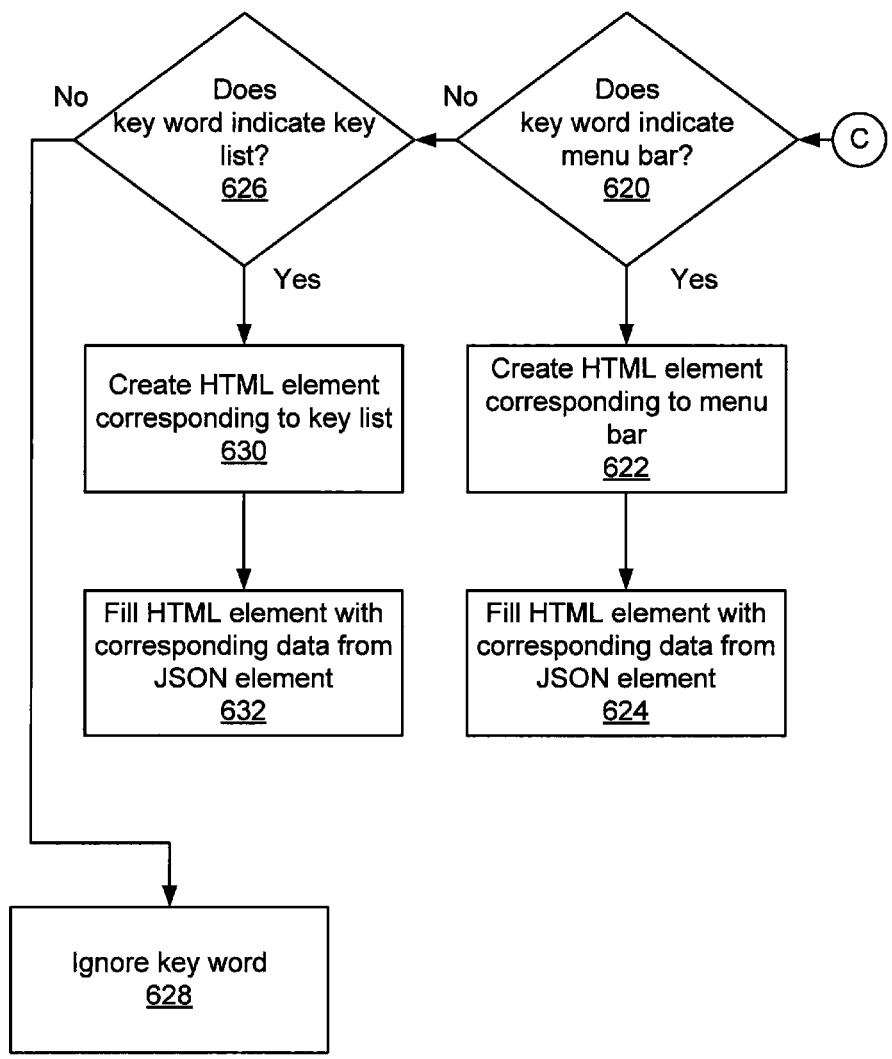

FIGS. 6A-B illustrate a block diagram of an exemplary method for converting JSON snippets 502 (of FIG. 5) to HTML snippets. In this regard, a JSON message may include any number of JSON snippets 502 that include key words and corresponding data for elements within the JSON snippets 502. The client 102 may process the JSON snippets 502 in any appropriate order by, for example, scanning the JSON message to identify and process the key words and associated data, creating an HTML element that is associated with the key word, and filling the HTML element with corresponding data from the JSON format. Referring to block 602, the JSON snippet 502 from a JSON message is processed by identifying key words in the JSON snippet 502 that indicate a corresponding HTML element. Examples of key words include field array key words (e.g., "output," "checkbox," and "input"); menu (e.g., "MNU"); cursor position (e.g., "cursor"); and key list (e.g., "key"). Alternate embodiments may include different or additional key words that may be used in a similar manner. For each key word in the JSON message, the client 102 (of FIG. 1) determines whether the key word indicates a field array entry in block 604. If yes, in block 606, the type of field (e.g., "output," "checkbox," or "input") is identified. An HTML element that corresponds to the type of identified field is created in block 608. In block 610, the HTML element is populated or filled with the corresponding field data from the JSON element in the JSON message. In no, (in block 604), in block 612, the client 102 determines whether the key word indicates cursor position. If yes, the client 102 determines whether the cursor position corresponds to an input field in block 614. If no, in block 618, an HTML element for cursor position is created and a default position is inserted into the HTML element. If yes (in block 614), an HTML element for cursor position is created, and the cursor position data from the JSON element is inserted into the corresponding HTML element in block 616. If no (in block 612), the client 102 determines whether the key word indicates a menu bar in block 620 (of FIG. 6B). If yes, an HTML element corresponding to a menu bar is created in block 622. In block 624, the HTML element is filled with corresponding data from the JSON element. In no (in block 620), the client 102 determines whether the key word indicates a key list in block 626. If no, the key word is ignored in block 628. If yes, an HTML element corresponding to a key list is created in block 630. In block 632, the HTML element is filled with corresponding key list data from the JSON element.

Figure 7A:
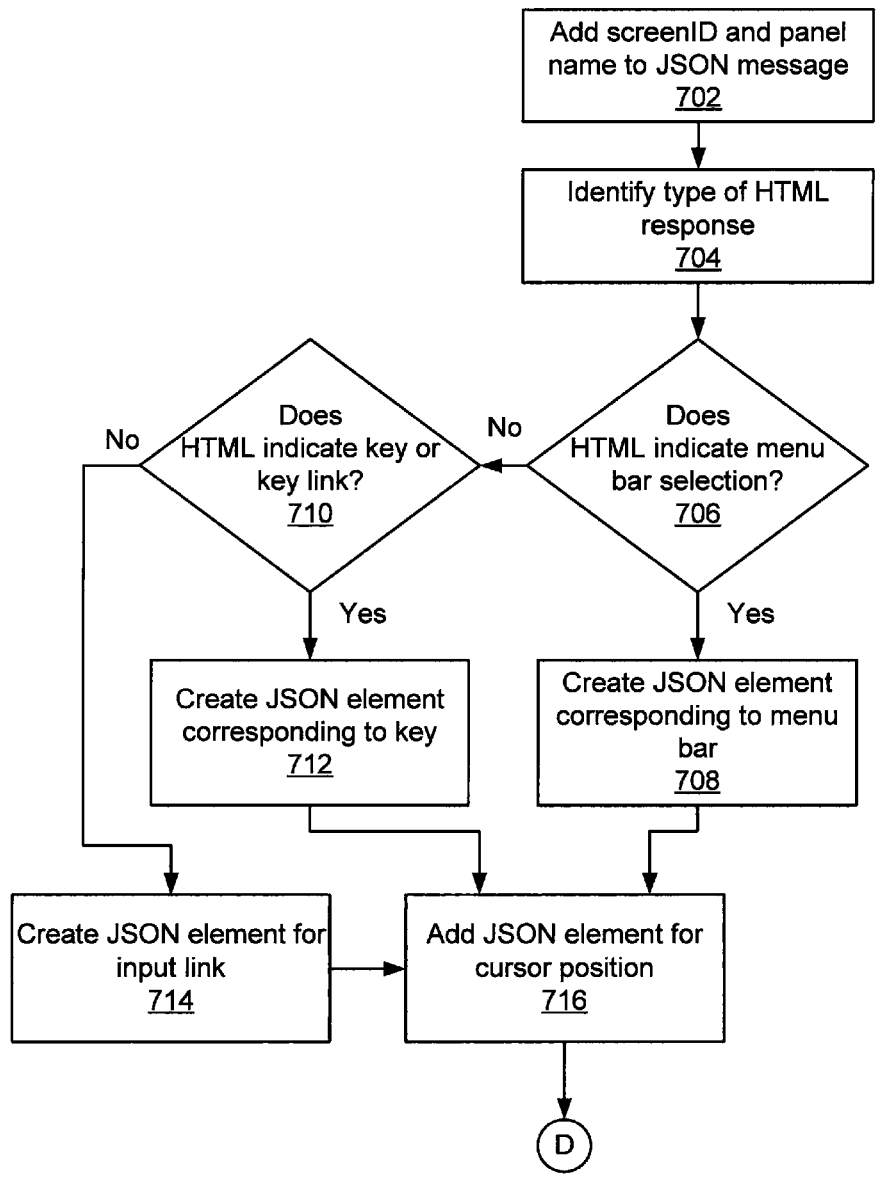
FIGS. 7A-B illustrate a block diagram of an exemplary method for converting the HTML response into JSON snippets.
Figure 7B:
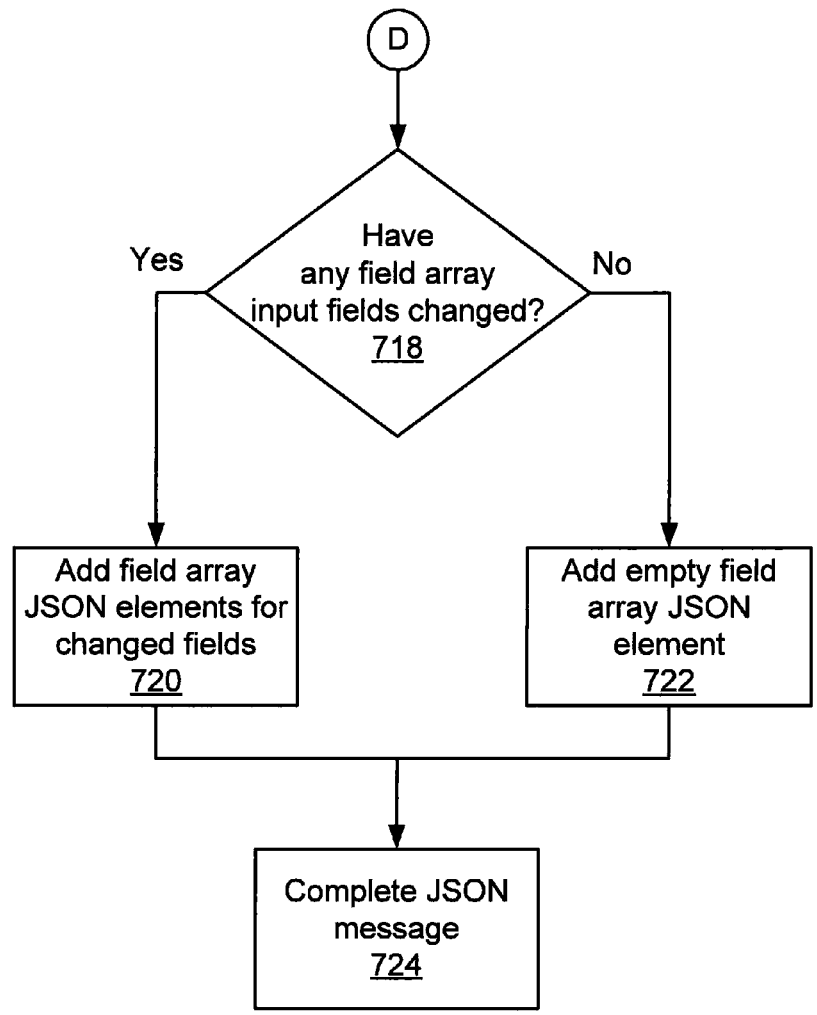

FIGS. 7A-B illustrate a block diagram of an exemplary method for converting HTML snippets to JSON snippets. Referring to block 702, a screen identifier (screen ID) and panel name are added to the JSON message that correspond to the screen ID and panel name that is, or was displayed on the client 102 (of FIG. 1). In block 704, the type of HTML response is identified. In block 706, if the HTML snippet indicates a menu bar selection, a corresponding JSON element is created and populated with the corresponding associated HTML data in block 708. If no (in block 706, in block 710, the client 102 determines whether the HTML snippet indicates a key or key link selection. If yes (in block 710), a JSON element corresponding to the key is created and populated with the HTML key or key link data in block 712. If no (in block 710), a JSON input link element is created and populated with corresponding input link data in block 714. In block 716, a JSON element cursor position is added to the JSON message. In block 718 (of FIG. 7B) the client 102 determines whether any field array input fields have changed by comparing the current values in the HTML elements to the original values passed in for display in the JSON field array. If yes, in block 720 field array elements for the changed fields are added. If no (in block 718), an empty field array JSON element is added in block 722. In block 724, the JSON data structure is completed and the message is sent to the servlet 104, which will send the JSON data to the message queue 108 for processing by the TSO 110 address space. For example, if the menu selection in FIG. 5 was chosen, the following corresponding JSON snippet may be sent: {"PANEL": {"SCREENID":"1","NAME":"SETTINGS","RESPONSE":{"TYPE":"CHOI CE","ID":"1-1"},"CURSOR": {"ROW":24,"COLUMN":14},"FIELDS": [ ]}}.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JavaScript, Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method including:
    requesting a time sharing option (TSO) address space on a first processor;
    receiving a message in a JavaScript object notation (JSON) format from the first processor, wherein the message is received from a servlet application based on the (TSO) address space in the first processor;
    converting the message from the JSON format into a hypertext markup language (HTML) format, wherein the message includes a screen ID;
    determining whether the screen ID of the message matches a screen ID associated with a first portion of the display
    based on determining that the screen ID of the message matches the screen ID associated with a first portion of the display to the user, presenting the content of the message in the HTML format in the first portion of the display; and
    based on determining that the screen ID of the message does not match the screen ID associated with a first portion of the display, generating a new portion of the display and presenting the content of the message in the HTML format in the new portion of the display to the user,
    wherein the new portion of the display is different from the first portion of the display.

2. The method of claim 1, wherein the converting the message from the JSON format into the HTML format includes:
    identifying a key word of the message in the JSON format;
    creating an HTML element associated with the key word; and
    filling the HTML element with corresponding data from the JSON format.

3. The method of claim 1, wherein the converting the message from JSON format into HTML format is performed by a web client application on a second processor.

4. The method of claim 1, wherein the first processor is a mainframe processor.

5. The method of claim 1, wherein the message is sent from an interactive system productivity facility (ISPF) session.

6. An article of manufacture tangibly embodying computer readable instructions which, when implemented, cause a computer to carry out the steps of a method according to claim 1.

7. A system including:
 a display; and
 a first processor communicatively connected to the display, the first processor operative to:
 receive a message in a JavaScript object notation (JSON) format from a second processor, wherein the message is received from a servlet application based on the time sharing option (TSO) address space of the second processor;
 convert the message from the JSON format into a hypertext markup language (HTML) format; and
 determine whether the screen ID of the message matches a screen ID associated with a first portion of the display
 based on a determination that the screen ID of the message matches the screen ID associated with a first portion of the display to the user, present the content of the message in the HTML format in the first portion of the display; and
 based on a determination that the screen ID of the message does not match the screen ID associated with a first portion of the display, generate a new portion of the display and present the content of the message in the HTML format in the new portion of the display to the user,
 wherein the new portion of the display is different from the first portion of the display.

8. The system of claim 7, wherein the converting the message from the JSON format into the HTML format includes:
 identifying a key word of the message in the JSON format;
 creating an HTML element associated with the key word; and
 filling the HTML element with corresponding data from the JSON format.

9. The system of claim 7, wherein the converting the message from JSON format into HTML format is performed by a web client application on the first processor.

10. The system of claim 7, wherein the second processor is a mainframe processor.

11. The system of claim 7, wherein the message is sent from an interactive system productivity facility (ISPF) session.

* * * * *